United States Patent
Slensker et al.

(10) Patent No.: US 12,273,338 B2
(45) Date of Patent: Apr. 8, 2025

(54) IDENTITY VERIFICATION THROUGH A CENTRALIZED BIOMETRIC DATABASE

(71) Applicant: BANK OF AMERICA CORPORATION, Charlotte, NC (US)

(72) Inventors: Neal Slensker, Fort Mill, SC (US); Joel R. Townsend, Spring Church, PA (US); Daniel J. August, Denver, NC (US); Kevin P. Thomsen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 655 days.

(21) Appl. No.: 17/075,102

(22) Filed: Oct. 20, 2020

(65) Prior Publication Data

US 2022/0124090 A1  Apr. 21, 2022

(51) Int. Cl.
| | | |
|---|---|---|
| *G06V 40/12* | (2022.01) | |
| *G06V 40/10* | (2022.01) | |
| *G06V 40/18* | (2022.01) | |
| *G06V 40/50* | (2022.01) | |
| *H04L 9/40* | (2022.01) | |

(52) U.S. Cl.
CPC .......... *H04L 63/0861* (2013.01); *G06V 40/10* (2022.01); *G06V 40/1365* (2022.01); *G06V 40/197* (2022.01); *G06V 40/58* (2022.01)

(58) Field of Classification Search
CPC ............... G06V 40/1365; G06V 40/50; H04L 63/0861; G07F 19/00; G07F 19/206; G06Q 30/0185
See application file for complete search history.

(56) References Cited

U.S. PATENT DOCUMENTS

| | | | |
|---|---|---|---|
| 5,534,855 A * | 7/1996 | Shockley | G06F 21/31 379/195 |
| 6,594,376 B2 | 7/2003 | Hoffman et al. | |
| 6,709,333 B1 * | 3/2004 | Bradford | G07F 17/32 463/29 |
| 6,980,670 B1 * | 12/2005 | Hoffman | G07C 9/37 705/14.23 |
| 6,983,882 B2 | 1/2006 | Cassone | |
| 7,042,335 B2 | 5/2006 | Franks | |
| 7,152,045 B2 * | 12/2006 | Hoffman | G07F 7/025 235/382 |

(Continued)

*Primary Examiner* — Daniel I Walsh

(57) ABSTRACT

An apparatus includes a memory and a processor. The memory stores biometric data obtained from an account holder at a first location and identification information provided by the account holder that was used to open an existing account at the first location. The processor receives, from a device, data corresponding to an applicant that includes biometric data obtained from the applicant at a second location and identification information provided by the applicant at the second location. The applicant is requesting to open a new account using the identification information at the second location. In response to receiving the applicant's data, the processor determines that the applicant's biometric data matches the account holder's biometric data. The processor also determines that the applicant's identification information does not match the account holder's identification information. In response, the processor transmits an alert to the device indicating that the applicant's identity could not be verified.

20 Claims, 5 Drawing Sheets

(56) References Cited

U.S. PATENT DOCUMENTS

| | | |
|---|---|---|
| 7,197,167 B2 | 3/2007 | Chung et al. |
| 7,415,138 B2 | 8/2008 | Schneider et al. |
| 7,494,060 B2 | 2/2009 | Zagami |
| 7,536,352 B2 | 5/2009 | Lapsley et al. |
| 7,542,590 B1 | 6/2009 | Robinson et al. |
| 7,548,981 B1* | 6/2009 | Taylor ................. H04L 63/0861 |
| | | 709/227 |
| 7,558,407 B2 | 7/2009 | Hoffman et al. |
| 7,593,549 B2 | 9/2009 | Reiner |
| 7,606,401 B2 | 10/2009 | Hoffman et al. |
| 7,689,832 B2 | 3/2010 | Talmor et al. |
| 7,779,457 B2* | 8/2010 | Taylor ................... G06Q 20/40 |
| | | 713/186 |
| 7,885,433 B2* | 2/2011 | Yano ....................... G06F 21/32 |
| | | 382/115 |
| 7,997,477 B2* | 8/2011 | Robinson ........... G06Q 20/4014 |
| | | 235/382 |
| 8,046,590 B2 | 10/2011 | Milgramm |
| 8,185,747 B2 | 5/2012 | Wood et al. |
| 8,266,443 B2 | 9/2012 | Errico |
| 8,483,659 B2 | 7/2013 | Mahajan |
| 8,506,394 B2 | 8/2013 | Kelly et al. |
| 8,583,498 B2 | 11/2013 | Fried et al. |
| 8,799,167 B2 | 8/2014 | Carper |
| 8,852,001 B2 | 10/2014 | Kelly et al. |
| 9,033,786 B2 | 5/2015 | Kelly et al. |
| 9,076,027 B2 | 7/2015 | Miura et al. |
| 9,141,951 B2 | 9/2015 | McNeal |
| 9,177,445 B2 | 11/2015 | Vemuri et al. |
| 9,519,901 B1 | 12/2016 | Dorogusker |
| 9,589,566 B2 | 3/2017 | Jones |
| 9,639,838 B2 | 5/2017 | McNelley et al. |
| 9,830,674 B2 | 11/2017 | Chung |
| 9,846,875 B2 | 12/2017 | McNeal |
| 9,876,803 B2 | 1/2018 | Miu et al. |
| 10,055,560 B2 | 8/2018 | Turgeman |
| 10,078,967 B2* | 9/2018 | Garcia .................... G06F 21/32 |
| 10,108,794 B2 | 10/2018 | Bouse |
| 10,109,281 B1 | 10/2018 | Jones |
| 10,135,802 B2 | 11/2018 | Miu |
| 10,375,065 B1 | 8/2019 | Hoffman |
| 10,664,834 B2 | 5/2020 | McNeal |
| 10,997,609 B1* | 5/2021 | Wang ...................... G10L 17/18 |
| 11,303,631 B1* | 4/2022 | Alexanian ............. G06V 40/50 |
| 11,551,237 B1* | 1/2023 | Hartsell ................. G06Q 40/02 |
| 11,605,093 B1* | 3/2023 | Cervantez .......... G06Q 30/0185 |
| 2002/0035542 A1* | 3/2002 | Tumey .................. G07F 7/1008 |
| | | 340/5.83 |
| 2004/0245330 A1* | 12/2004 | Swift ..................... G06Q 20/04 |
| | | 235/379 |
| 2006/0000894 A1* | 1/2006 | Bonalle .............. G06K 19/0718 |
| | | 235/382 |
| 2006/0015733 A1* | 1/2006 | O'Malley ................. G07F 7/08 |
| | | 713/176 |
| 2006/0101508 A1* | 5/2006 | Taylor ...................... G07C 9/37 |
| | | 340/5.82 |
| 2010/0216429 A1* | 8/2010 | Mahajan ................ G06F 21/88 |
| | | 455/410 |
| 2011/0119141 A1* | 5/2011 | Hoyos .................... G06Q 20/20 |
| | | 705/16 |
| 2012/0130885 A1* | 5/2012 | Feiereisen ........ G06Q 20/40145 |
| | | 705/38 |
| 2013/0259330 A1* | 10/2013 | Russo ................ G06V 40/1365 |
| | | 382/115 |
| 2013/0317328 A1* | 11/2013 | Ridder .................. A61B 5/1455 |
| | | 600/314 |
| 2014/0230032 A1* | 8/2014 | Duncan ............... H04L 63/0861 |
| | | 726/7 |
| 2014/0230033 A1* | 8/2014 | Duncan ................... G06F 21/32 |
| | | 726/7 |
| 2014/0258123 A1* | 9/2014 | Fernandes .......... G06Q 20/4015 |
| | | 705/44 |
| 2015/0026060 A1* | 1/2015 | Krietzman ......... G06Q 20/3221 |
| | | 705/44 |
| 2015/0186014 A1* | 7/2015 | Li ....................... G06Q 30/0641 |
| | | 715/780 |
| 2015/0339671 A1* | 11/2015 | Krietzman ............ G06Q 20/042 |
| | | 705/44 |
| 2016/0140331 A1* | 5/2016 | Perez ...................... G06F 21/32 |
| | | 726/18 |
| 2016/0269411 A1 | 9/2016 | Malachi |
| 2016/0300236 A1* | 10/2016 | Wiley ..................... G06F 21/32 |
| 2017/0213022 A1* | 7/2017 | Potash .................. G06V 40/10 |
| 2017/0353450 A1* | 12/2017 | Koved .................. H04L 63/045 |
| 2019/0311100 A1* | 10/2019 | Lindell .................. G06F 21/32 |
| 2019/0319808 A1* | 10/2019 | Fallah .................. H04L 9/3239 |
| 2020/0068399 A1* | 2/2020 | Brown ................. H04L 9/3236 |
| 2022/0124090 A1* | 4/2022 | Slensker .................. G06V 40/10 |
| 2022/0248168 A1* | 8/2022 | De Souza Ferraz .. H04W 4/021 |
| 2022/0292514 A1* | 9/2022 | Chen ................... G06Q 20/102 |

\* cited by examiner

IDENTITY VERIFICATION THROUGH A CENTRALIZED BIOMETRIC DATABASE

TECHNICAL FIELD

The present disclosure relates generally to information storage and retrieval, and more particularly, to identity verification through a centralized biometric database.

BACKGROUND

Biometrics are measures of a person's physical characteristics, which may be used to verify the person's identity. Examples of biometric data include fingerprints, palm prints, facial scans, voice recordings, iris scans, and DNA, among others.

SUMMARY

Organizations frequently use biometric data to authenticate the identities of their registered users. For example, when a user instructs an organization to conduct a transaction on his/her behalf, the organization may first collect biometric data (e.g., fingerprints, iris scan, etc.) from the user to authenticate the user's identity. In such situations, only after the organization has authenticated the user's identity will the organization conduct the transaction. In this manner, the organization may protect itself and its users from imposters attempting to impersonate registered users of the organization.

Such authentication relies on the ability of the organization to access known biometric data of its users, to which the organization can compare biometric data collected from individuals purporting to be registered users of the organization. Typically, the known biometric data is collected during a registration process. For example, when a user opens an account with an organization, the organization may collect biometrics from the user for use in future authentication attempts. While this process may help prevent imposters who are attempting to conduct fraudulent transactions from impersonating previously registered users, it does not prevent imposters from impersonating individuals during the registration process itself. For example, an imposter may be able to open an account linked to a fake identity with an organization simply by providing false identification documentation to the organization during the registration process. While the organization may collect biometrics from the imposter during the process of creating an account for him/her, the biometrics are typically not used for identity verification during the registration process. Rather, they are simply linked to the false identity provided by the imposter, and stored for use in future authentications of the imposter.

This disclosure contemplates an identity verification system designed to use biometric data to help prevent applicants from providing inaccurate personal information when opening accounts with participating institutions. The system includes a central biometrics database managed by a biometric identification tool. When an applicant attempts to open an account with one of the participating institutions, the institution may provide biometric data and identification information obtained from the applicant to the biometric identification tool. The tool first determines whether the applicant's biometric data already exists within the biometric database. If the biometric data does not exist within the database, the tool registers the applicant with the biometric database by storing the applicant's biometric data and identification information in the database. If the applicant's biometric data does exist within the database, the tool next determines whether the identification information provided by the applicant is consistent with the identification information stored in the database. If the information is consistent, the tool transmits a message to the member institution informing the institution that the applicant's identity has been verified. If the information is inconsistent, the tool transmits an alert to the member institution informing the institution that the applicant may be providing false information to the institution. In certain embodiments, the tool may additionally determine whether the applicant's biometric data is stored in an existing biometric database, such as a law enforcement database. If the tool determines that the applicant's biometric data is stored in an existing biometric database, the tool may provide any information about the applicant, obtained from the existing database, to the member institution. An embodiment of the tool is described below.

According to one embodiment, an apparatus includes a memory and a hardware processor communicatively coupled to the memory. The memory stores data corresponding to a first account holder. The data corresponding to the first account holder includes biometric data obtained from the first account holder at a first location and identification information provided by the first account holder at the first location. The identification information provided by the first account holder was used to open an existing account at the first location. The hardware processor receives, from a device, data corresponding to a first applicant. The data corresponding to the first applicant includes biometric data obtained from the first applicant at a second location, and identification information provided by the first applicant at the second location. The first applicant is requesting to open a new account using the identification information at the second location. In response to receiving the data corresponding to the first applicant, the hardware processor determines that the biometric data obtained from the first applicant matches the biometric data obtained from the first account holder and stored in the memory. The hardware processor also determines that the identification information provided by the first applicant does not match the identification information provided by the first account holder and stored in the memory. In response to determining that the biometric data obtained from the first applicant matches the biometric data obtained from the first account holder and that the identification information provided by the first applicant does not match the identification information provided by the first account holder, the hardware processor transmits an alert to the device. The alert indicates that an identity of the first applicant could not be verified.

Certain embodiments provide one or more technical advantages. As an example, an embodiment enables a group of member institutions to act cooperatively to create a centralized database of biometric information, which they may use to verify the identities of applicants seeking to open accounts at their institutions. As another example, an embodiment enables institutions to leverage biometric data previously collected by external organizations, such as law enforcement agencies, to help the institutions identify individuals who may pose security threats. As another example, an embodiment stores hash values of individuals' biometric data in a central database, thereby helping to secure the privacy of the biometric data. As a further example, an embodiment automatically initiates security procedures in response to determining that an individual is attempting to open an account at an institution using a fake identity.

The system described in the present disclosure may particularly be integrated into a practical application of an identity verification system for use by a network of institutions. Each member institution may store identification information and biometric data obtained from its account holders in a central database that may be accessed by other members of the network. When an applicant attempts to open a new account at any of the member institutions, that institution may use the central database to determine, based on the applicant's biometric data, whether the applicant has previously opened any existing accounts and, if so, whether the applicant has used consistent identification information when opening each of these accounts.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
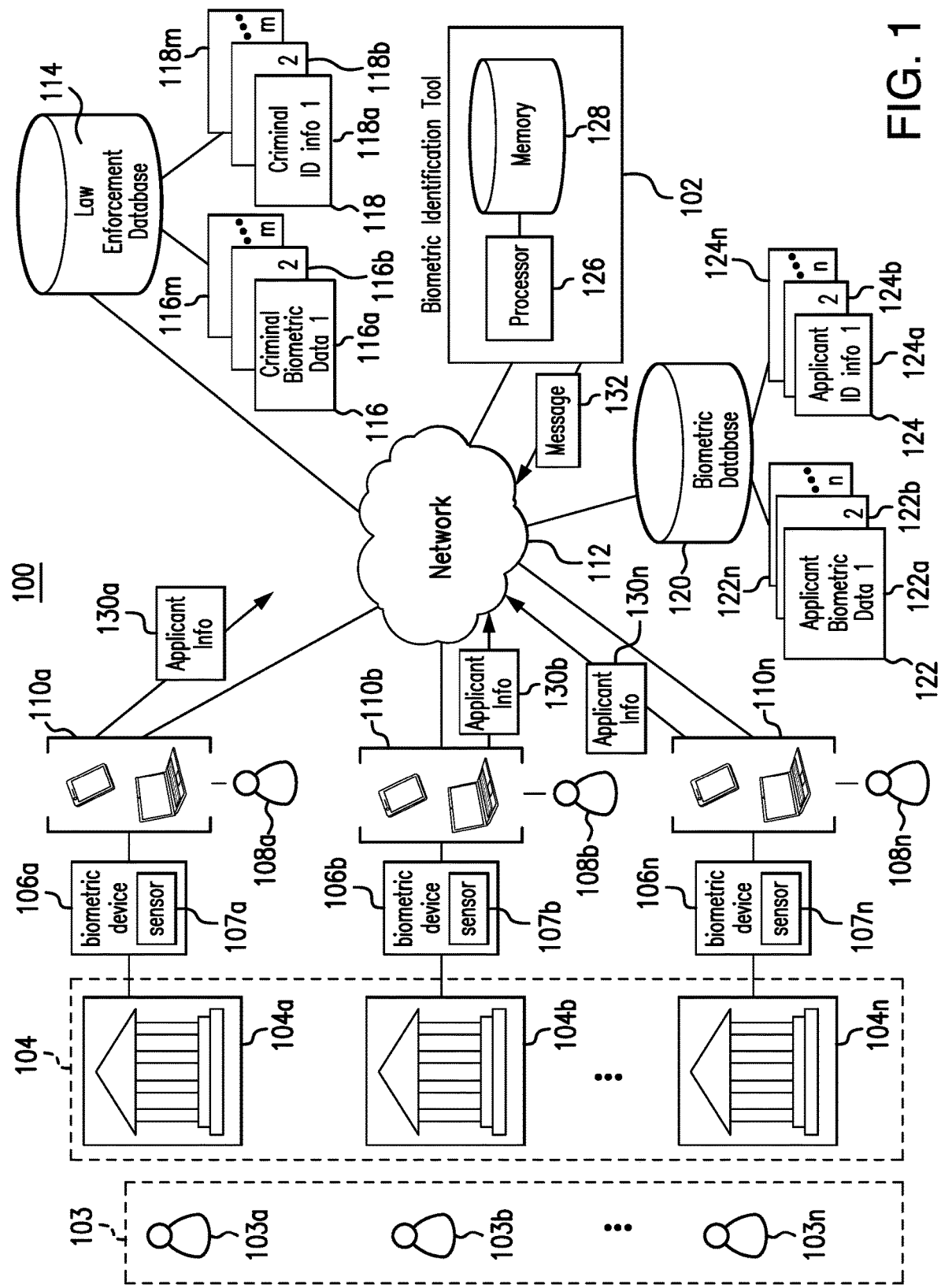
FIG. 1 illustrates an example identity verification system.

FIG. 1 illustrates an example identity verification system 100 that includes biometric identification tool 102, institution(s) 104, biometric device(s) 106a through 106n, user(s) 108a through 108n, device(s) 110a through 110n, network 112, external database 114, and biometric database 120. Generally, biometric identification tool 102 receives applicant information 130a through 130n from devices 110a through 110n, respectively. Each set of applicant information 130a through 130n includes biometric data and identification information provided by an applicant 103 while attempting to open an account at an institution 104, as described in further detail below, in the discussion of FIG. 2. In response to receiving a set of applicant information 130a through 130n, biometric identification tool 102 determines whether the biometric data provided in the applicant information exists within biometric database 120. For example, in response to receiving applicant information 130a, biometric identification tool 102 determines whether the biometric data provided in applicant information 130a exists within biometric database 120. If the applicant's biometric data does not exist within biometric database 120, biometric identification tool 102 registers applicant 103a with biometric database 120, by storing applicant information 130a in biometric database 120, as described in further detail below, in the discussion of FIG. 3A. If the applicant's biometric data does exist within biometric database 120, biometric identification tool 102 determines whether the corresponding identification information stored in biometric database 120 is consistent with the identification information provided by applicant 103a, and alerts device 110a to any inconsistencies, as described in further detail below, in the discussion of FIG. 3B. In certain embodiments, biometric identification tool 102 additionally determines whether applicant 103a's biometric data exists within an external database 114, such as a law enforcement database, and alerts device 110a to any such existence. This feature of biometric identification tool 102 is described in further detail below, in the discussion of FIGS. 3A and 3B.

Institutions 104a through 104n include any organizations with which individuals 103a through 103n may open accounts. For example, institutions 104 may include financial institutions (e.g., banks, credit unions, brokerage firms etc.), telephone providers, television providers, and/or any other suitable service providers. In certain embodiments, institutions 104a through 104n correspond to different locations of the same organizations. For example, in certain embodiments, institutions 104a through 104n correspond to branch locations of a bank. In some embodiments, institutions 104a through 104n correspond to different organizations of a similar type. For example, in certain embodiments, institutions 104a through 104n may correspond to a network of banks that have agreed to share biometric data with one another.

Individuals 103 may attempt to open accounts at institutions 104 in any suitable manner. As an example, in certain embodiments, institution 104a is a physical location and individual 103a may attempt to open an account with institution 104a by applying for the account in person at institution 104a. As another example, in certain embodiments, institution 104a is associated with a website and individual 103a may attempt to open an account with institution 104a by submitting information over the internet to institution 104a, using the website.

Biometric devices 106a through 106n are used by institutions 104 to obtain biometric data from individuals 103. Each biometric device 106a through 106n includes one or more biometric sensors 107a through 107n. Biometric sensors 107a through 107n may include any appropriate components capable of acquiring one or more types of biometric data from individuals 103. For example, biometric sensors 107a through 107n may correspond to fingerprint scanners, eye scanners, voice recorders, cameras, and/or any other suitable components capable of capturing information related to one or more characteristics of individuals 103. Each biometric device 106a through 106n may include any number of biometric sensors 107a through 107n.

In certain embodiments, biometric devices 106a through 106n are located inside institutions 104a through 104n, respectively. For example, in embodiments in which institution 104a corresponds to a physical building, biometric device 106a may be located inside the building and used by a user (e.g., a bank teller/associate) 108a to obtain biometric data from an individual 103a applying for an account with institution 104a. In some embodiments, biometric devices 106a through 106n may be located remotely from institutions 104a through 104n, but in communication with institutions 104a through 104n. For example, in embodiments in which institution 104a is associated with a website, biometric device 104a may correspond to a device in the possession of individual 103a, which is used by individual 103a to submit his/her biometric information to the website. As a specific example, biometric device 106a may correspond to a mobile device operated by individual 103a and capable of capturing biometrics from individual 103a. For instance, the mobile device may be used to capture fingerprint information, voice recordings, facial images, and/or any other suitable biometric data from individual 103a. As another specific example, in certain embodiments, biometric device 106a may correspond to a device (e.g., a pluggable USB device) which may be plugged into a computer system operated by individual 103a.

Biometric devices 106a through 106n include any appropriate devices for capturing biometric data from individuals 103 and communicating this data to devices 110a through 110n, respectively. Each biometric device 106a through 106n may include a memory device for recording biometric data sensed by biometric sensors 107a through 107n prior to communicating this data to devices 110a through 110n. Each biometric device 106a through 106n may also include a user interface, such as a display, a microphone, keypad, or other appropriate terminal equipment usable by a user 108a through 108n. In some embodiments, an application executed by a processor of each biometric device 106a through 106n may perform the functions described herein.

Devices 110a through 110n are used by users 108a through 108n to receive applicant information 130a through 130n from individuals 103a through 103n. Each set of applicant information 130a through 130n includes biometric data and identification information obtained from each individual 103a through 103n, respectively. Each set of applicant information 130a through 130n may include any type of biometric data. For example, applicant information 130a may include data associated with individual 103a's fingerprint(s), palmprint, voice, iris, DNA, facial image, and/or any other suitable physical characteristic of individual 103a. Each set of applicant information 130a through 130n may also include any type of non-biometric identification information. For example, applicant information 130a may include identification information such as individual 103a's (1) name; (2) address; (3) phone number; (4) date of birth; (5) social security number; (6) driver license number; (7) passport number; and/or (8) any other suitable type of non-biometric identification information.

Devices 110a through 110n may receive applicant information 130a through 130n from individuals 103a through 103n in any suitable manner. As an example, in certain embodiments, device 110a receives individual 103a's biometric data directly from biometric device 106a. For example, in some embodiments, biometric device 106a is in direct communication with device 110a (e.g., biometric device 106a is directly connected to device 110a within institution 104a). In certain embodiments, biometric device 106a is integrated within device 110a, such that biometric device 106a and device 110a constitute the same piece of physical equipment. As another example, in certain embodiments, device 110a receives individual 103a's biometric data from biometric device 106a over network 112. For example, in certain embodiments, biometric device 106a is a mobile device used by individual 103a to capture his/her biometric data and to transmit the biometric data to device 110a over network 112 by, for example, uploading the biometric data to a website operated by institution 104a. As another example, in certain embodiments, user 108a may enter individual 103a's identification information into device 110a. For example, individual 103a may provide user 108a with identification information while inside institution 104a (e.g., verbally and/or through written documents) and user 108a may enter this information into device 110a. As a further example, in certain embodiments, device 110a receives individual 103a's identification information over network 112. For example, in certain embodiments, individual 103a provides a website operated by institution 104a with his/her identification information (e.g., by inputting the information into a form displayed on the website, and/or uploading scanned copies of identification documents to the website), and device 110a accesses this information using network 112.

Devices 110a through 110n are also used by users 108a through 108n, located on network 112, to communicate applicant information 130a through 130n to biometric identification tool 102. As an example, in certain embodiments, device 110a is used by user 108a to communicate applicant information 130a, which includes biometric data obtained from individual 103a and/or identification information provided by applicant 103a, to biometric identification tool 102. In certain embodiments, devices 110a through 110n encrypt applicant information 130a through 130n prior to sending it to biometric identification tool 102. For example, devices 110a through 110n may encrypt applicant information 130a through 130n, respectively, using public key encryption and/or symmetric key encryption.

Devices 110a through 110n are additionally used by users 108a through 108n, located on network 112, to receive messages and/or alerts 132 from biometric identification tool 102. As an example, in certain embodiments, biometric identification tool 102 may determine that applicant 103a's biometric data (as provided in applicant information 130a) does not exist in biometric database 120. In response, biometric identification tool 102 may transmit a message 132 to device 110a indicating that the tool added applicant information 130a to biometric database 120. As another example, in certain embodiments, biometric identification tool 102 may determine that applicant 103a's biometric data (as provided in applicant information 130a) exists within biometric database 120 (for example as biometric data 122a), and that applicant 103a's identification information (as provided in applicant information 130a) is consistent with the corresponding identification information stored within biometric database 120 (for example as identification information 124a). In response, biometric identification tool 102 may transmit a message 132 to device 110a indicating that the tool verified applicant 103a's identity. As another example, in certain embodiments, biometric identification tool 102 may determine that applicant 103a's biometric data (as provided in applicant information 130a) exists within biometric database 120 (for example, as biometric data 122a), and that applicant 103a's identification information (as provided in applicant information 130a) is inconsistent with the corresponding identification information stored within biometric database 120 (for example, as identification information 124a). In response, biometric identification tool 102 may transmit a message/alert 132 to device 110a indicating that the tool was unable to verify applicant 103a's identity. As another example, in certain embodiments, biometric identification tool 102 may determine that applicant 103a's biometric data (as provided in applicant information 130a) does not exist within external database 114. In response, biometric identification tool 102 may transmit a message 132 to device 110a indicating that the tool was not able to locate applicant 103a's biometric data within external database 114. As a further example, in certain embodiments, biometric identification tool 102 may determine that applicant 103a's biometric data (as provided in applicant information 130a) exists within external database 114 (for example, as biometric data 116a). In response, biometric identification tool 102 may transmit a message 132 to device 110a that includes any information associated with the biometric data that is stored in external database 114 (for example, as information 118a). For instance, external database 114 may be a law enforcement database, and message 132 may include information related to any arrests and/or criminal charges applicant 103a has faced.

In certain embodiments, in response to receiving a message 132 indicating that biometric identification tool 102 was unable to verify applicant 103a's identity, and/or that biometric identification tool 102 located applicant 103a's biometric data (as provided in applicant information 130a) within external database 114, device 110a may initiate one or more security procedures. As an example, in certain embodiments, device 110a may display a message to user 108a instructing user 108a to decline opening an account for individual 103a. As another example, in certain embodiments, device 110a may instruct user 108a to obtain additional information from individual 103a. For example, message 132 may indicate that the address that individual 103a provided in applicant information 130a does not match the address stored in biometric database 120. Accordingly, device 110a may instruct user 108a to obtain one or more previous addresses of individual 103a for comparison with the information stored in database 120. As another example, in certain embodiments, device 110a may automatically transmit a message to a law enforcement agency notifying the law enforcement agency of potentially fraudulent activity. As another example, in certain embodiments where the biometric data provided by individual 130a exists in biometric database as biometric data 122a, device 110a may automatically lock an account associated with biometric data 122a (e.g., an account that was previously opened when biometric data was first stored in biometric database 120 as biometric data 122a). For example, device 110a may lock the account associated with biometric data 122a where the account was opened at institution 104a or another institution 104b belonging to the same organization as institution 104a (e.g., another branch of the same bank). As a further example, in certain embodiments where the biometric data provided by individual 130a exists in biometric database as biometric data 122a, device 110a may transmit a message to device 110b indicating that biometric data 122a was associated with a fraudulent attempt to open an account at institution 104a. For example, device 110a may transmit such a message to device 110b where biometric data 122a was used to open an existing account at institution 104b, and institution 104b corresponds to a different organization from institution 104a (e.g., different banks that have agreed to share biometric data with one another). In response to receiving such a message, device 110b may automatically lock the account associated with biometric data 122a.

Devices 110a through 110n include any appropriate devices for communicating with components of system 100 over network 112. For example, each device 110a through 110n may be a telephone, a mobile phone, a computer, a laptop, a wireless or cellular telephone, a tablet, a server, and IoT device, and/or an automated assistant, among others. This disclosure contemplates devices 110a through 110n being any appropriate device for sending and receiving communications over network 112. Each device 110a through 110n may also include a user interface, such as a display, a microphone, keypad, or other appropriate terminal equipment usable by a user 108a through 108n. In some embodiments, an application executed by a processor of each device 110a through 110n may perform the functions described herein.

Network 112 facilitates communication between and amongst the various components of system 100. This disclosure contemplates network 112 being any suitable network operable to facilitate communication between such components. Network 112 may include any interconnecting system capable of transmitting audio, video, signals, data, messages, or any combination of the preceding. Network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

External database 114 is a database operated by an external organization, such as a law enforcement agency or a credit ratings agency. External database 114 stores biometric data 116 obtained from one or more individuals, along with information 118 about those individuals. Information 118 may include any relevant information about the individuals. For example, in certain embodiments, information 118 includes information related to any criminal activities the individuals have participated in, such as information related to arrests, criminal charges, and/or convictions. In some embodiments, information 118 may include credit scores of the individuals. In certain embodiments, biometric identification tool 102 may directly access external database 114. For example, in certain embodiments, biometric identification tool 102 may access external database 114 to compare biometric data received in applicant information 130 to biometric data 116 stored in external database 114. In response to determining that biometric data received in applicant information 130 matches biometric data 116a stored in external database 114, biometric identification tool 102 may access information 118a stored in external database 114 as corresponding to biometric data 116a and provide this information to device 110a. In some embodiments, biometric identification tool 102 may not directly access external database 114. For example, in certain embodiments, biometric identification tool 102 may transmit biometric data received in applicant information 130 to an external system managing external database 114. This external system may then determine whether the received biometric data matches any biometric data 116 stored in external database 114 and send any corresponding information 118 to biometric identification tool 102 in response to discovering a match.

Biometric database 120 is any database capable of storing sets of biometric data 122a through 122n, along with corresponding sets of identification information 124a through 124n. Each set of biometric data 122a through 122n (and corresponding set of identification information 124a through 124n) corresponds to an individual 103 who previously opened (or, in certain embodiments, attempted to open) an account at an institution 104. In certain embodiments, biometric data 122a through 122n was stored in biometric database 120 by biometric identification tool 102 during the account opening process. Biometric database 120 may store any types of biometric data 122. For example, biometric data 122 may include data associated with an individual 103's fingerprint(s), palmprint, voice, iris, DNA, facial image, and/or any other suitable physical characteristic of the individual. Similarly, biometric database 120 may store any suitable types of identification information 124. For example, identification information 124 may include identification information such as an individual 103's (1) name; (2) address; (3) phone number; (4) date of birth; (5) social security number; (6) driver license number; (7) passport number; and/or (8) any other suitable type of non-biometric identification information.

Biometric database 120 may store biometric data 122 and/or identification information 124 in any suitable format. As an example, in certain embodiments, biometric database 120 stores the raw data captured by sensors 107a through 107n as biometric data 122. As another example, in certain embodiments, biometric database 120 stores sets of features extracted from the raw data captured by sensors 107a through 107n as biometric data 122. For example, for a given individual 103a, biometric database 120 may store a set of fingerprint minutiae as biometric data 122a, rather than the individual's full fingerprint(s). As another example, in certain embodiments, biometric database 120 may store encrypted forms of biometric data 122 and/or identification information 124. This may be desirable to help protect the security of an individual's biometric data 122 and identification 124. In some embodiments, biometric database 120 may store hashed values of an individual's biometric data as biometric data 122. For example, in certain embodiments, biometric identification tool 102 may use a fuzzy hashing algorithm 129 to store hashed values of biometric data in biometric database 120. In contrast to traditional cryptographic hash functions, in which a slight change to the input may generate a completely different output, fuzzy hashing algorithm 129 tolerates a certain degree of variation in the input. Accordingly, fuzzy hashing may be appropriate for biometric data 122, which tends to be subject to slight variations. For example, slight variations may occur to an individual's fingerprint based on the pressure the individual applies when providing the fingerprint. While such slight variations may lead to completely different traditional hash values, they may nevertheless lead to similar fuzzy hash values. For example, a comparison between a fuzzy hash value of a fingerprint provided in applicant information 130 and a fuzzy hash value of a fingerprint stored in biometric database 120 may indicate that the fingerprints are a 99.9% match, and therefore likely correspond to the same individual 103.

As seen in FIG. 1, biometric identification tool 102 includes a processor 126 and a memory 128. This disclosure contemplates processor 126 and memory 128 being configured to perform any of the functions of biometric identification tool 102 described herein. Generally, biometric identification tool 102 receives applicant information 130a through 130n from devices 110a through 110n, respectively. Each set of applicant information 130a through 130n includes biometric data and identification information provided by an applicant 103 while attempting to open an account at an institution 104, as described in further detail below, in the discussion of FIG. 2. In response to receiving a set of applicant information 130a through 130n, biometric identification tool 102 determines whether the biometric data provided in the applicant information exists within biometric database 120. For example, in response to receiving applicant information 130a, biometric identification tool 102 determines whether the biometric data provided in applicant information 130a exists within biometric database 120. If the applicant's biometric data does not exist within biometric database 120, biometric identification tool 102 registers applicant 103a with biometric database 120, by (1) storing the applicant's biometric data in biometric database 120 as biometric data 122a, and (2) storing the applicant's identification information in biometric database 120 as identification information 124a. These functions of biometric identification tool 102 are described in further detail below, in the discussion of FIG. 3A. If the applicant's biometric data, as provided in applicant info 130a, does exist within biometric database 120, for example as biometric data 122b, biometric identification tool 102 determines whether identification information 124b, corresponding to biometric data 122b, matches the applicant's identification information, as provided in applicant info 130a. If identification information 124b matches applicant's identification information, as provided in applicant info 130a, in certain embodiments, biometric identification tool 102 transmits a message 132 to device 110a indicating that applicant 103a's identify has been verified. If identification information 124b does not match applicant's identification information, as provided in applicant info 130a, biometric identification tool 102 transmits an alert 132 to device 110a indicating that applicant 103a's identity could not be verified. These features of biometric identification tool 102 are described in further detail below, in the discussion of FIG. 3B. In certain embodiments, biometric identification tool 102 additionally determines whether applicant 103a's biometric data exists within external database 114, and alerts device 110a to any such existence. This feature of biometric identification tool 102 is described in further detail below, in the discussion of FIGS. 3A and 3B.

Processor 126 is any electronic circuitry, including, but not limited to computer processing units (CPUs), graphics processing units (GPUs), microprocessors, application specific integrated circuits (ASIC), application specific instruction set processor (ASIP), and/or state machines, that communicatively couples to memory 128 and controls the operation of biometric identification tool 102. Processor 126 may be 8-bit, 16-bit, 32-bit, 64-bit or of any other suitable architecture. Processor 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 126 may include other hardware and software that operates to control and process information. Processor 126 executes software stored on memory 128 to perform any of the functions described herein. Processor 126 controls the operation and administration of biometric identification tool 102 by processing information received from network 112, biometric devices 106a through 106n, devices 110a through 110n, external database 114, biometric database 120, and/or memory 128. Processor 126 may be a programmable logic device, a microcontroller, a microprocessor, any suitable processing device, or any suitable combination of the preceding. Processor 126 is not limited to a single processing device and may encompass multiple processing devices.

Memory 128 may store, either permanently or temporarily, data, operational software, or other information for processor 126. Memory 128 may include any one or a combination of volatile or non-volatile local or remote devices suitable for storing information. For example, memory 128 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 128, a disk, a CD, or a flash drive. In particular embodiments, the software may include an application executable by processor 126 to perform one or more of the functions described herein.

In certain embodiment, memory 128 may store one or more algorithms 129. Biometric identification tool 102 may use algorithms 129 to store biometric data 122 and/or identification information 124 in biometric database 120 and/or to determine whether biometric data obtained from an individual 103 matches biometric data stored in biometric database 120. As an example, algorithms 129 may include one or more encryption algorithms, such as Triple DES, RSA, MDS, Blowfish, and/or any other suitable encryption algorithm. As another example, algorithms 129 may include one or more hashing algorithms, such as a fuzzy hashing algorithm. As a further example, algorithms 129 may include one or more machine learning algorithms. For example, algorithms 129 may include one or more facial recognition algorithms.

Modifications, additions, or omissions may be made to the systems described herein without departing from the scope of the invention. For example, system 100 may include any number of institutions 104, biometric devices 106a through 106n, users 108a through 108n, devices 110a through 110n, networks 112, external databases 114, and biometric databases 120. The components may be integrated or separated. Moreover, the operations may be performed by more, fewer, or other components. Additionally, the operations may be performed using any suitable logic comprising software, hardware, and/or other logic.

II. Data Collection

Figure 2:
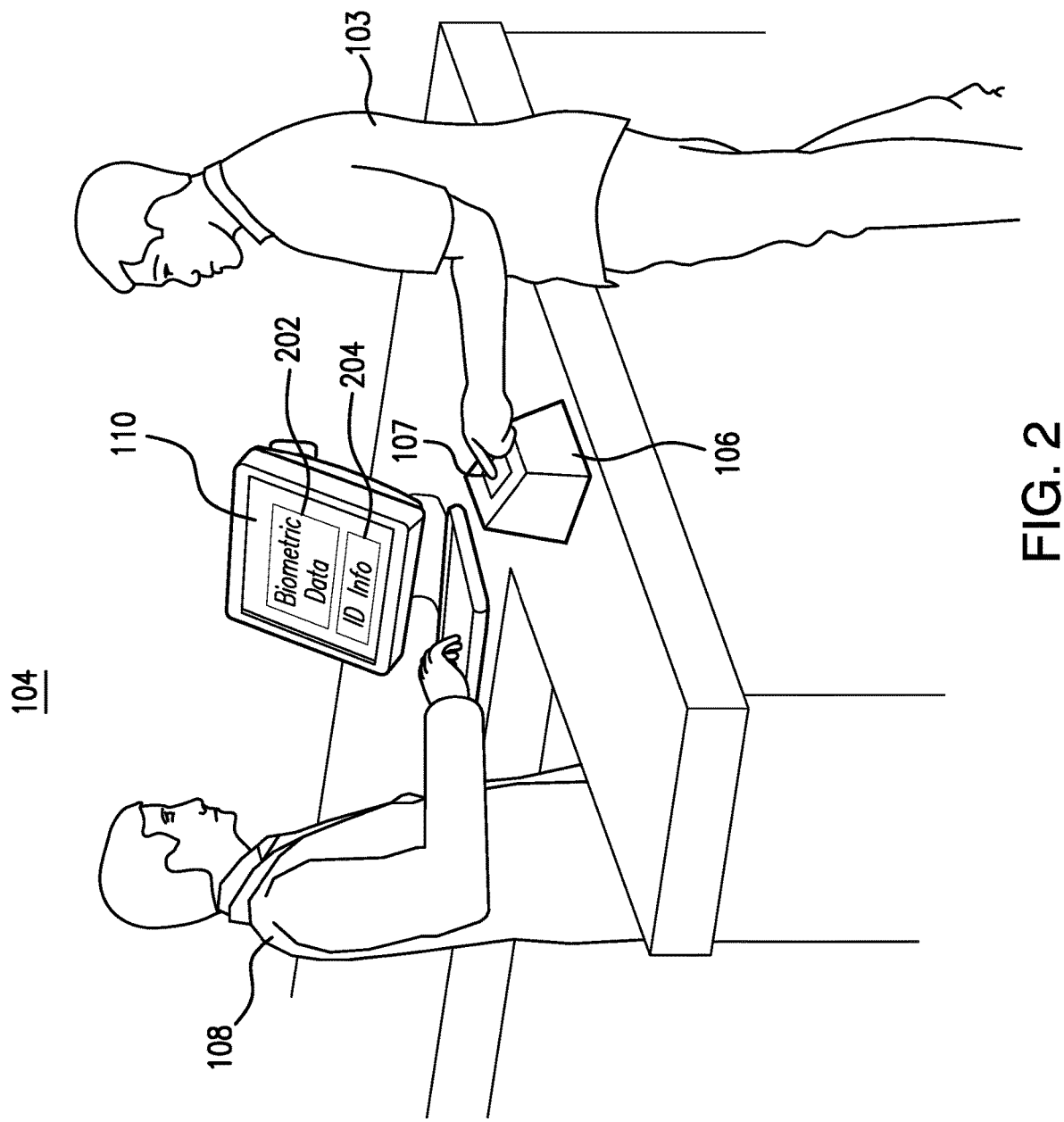
FIG. 2 illustrates an example of the use of a biometric device of the identity verification system of FIG. 1 to obtain biometric data from an account applicant.

FIG. 2 presents an example of the use of a biometric device 106 of system 100 to obtain biometric data 202 and identification information 204 from an account applicant 103. As illustrated in FIG. 2, individual 103 is attempting to open an account with institution 104. For example, in certain embodiments, individual 103 may be attempting to open a bank account at a bank 104. User 108 belongs to institution 104 and is aiding individual 103 in the account application process. For example, in certain embodiments, user 108 is a bank teller/associate.

During the account application process, user 108 obtains identification information 204 from individual 103. For example, user 108 may ask individual 103 for his/her name, address, phone number, date of birth, etc. User 108 may also ask individual 103 to present identification documents such as a driver license, passport, social security card, etc. User 108 enters individual 103's identification information 204 into device 110. Device 110 then transmits this information to the biometric identification tool 102 of FIG. 1.

As illustrated in FIG. 2, during the account application process, user 108 also obtains biometric data 202 from individual 103. For example, user 108 may operate one or more biometric devices 106 to obtain biometric data 202 from individual 103. Biometric data 202 may be any suitable type of biometric data. For example, biometric data 202 may include a fingerprint, a palmprint, an iris scan, a photograph, a voice recording, and/or any other suitable type of biometric data. Biometric device 106 includes one or more sensors 107 capable of obtaining biometric data 202 from individual 103. For example, sensor 107 may include a fingerprint scanner, an eye scanner, a voice recorder, a camera, and/or any other suitable type of biometric sensor. In response to obtaining biometric data 202 from individual 103, biometric device 106 provides this data to device 110, which transmits the data to the biometric identification tool 102 of FIG. 1.

While FIG. 2 illustrates an individual 103 applying for an account with institution 104 in person, this disclosure contemplates that individual 103 may apply for an account with institution 104 in any suitable manner. For example, in certain embodiments, individual 103 may apply for an account with institution 104 using a website of institution 104. In such embodiments, individual 103 may enter his/her personal information 204 into a form displayed on the website. Individual 103 may also use a mobile device and/or any other appropriate device to capture biometric data 202 (e.g., a fingerprint, a voice recording, an image etc.), and then upload this biometric data 202 to the website.

III. Registering an Account Applicant with a Biometric Database

Figure 3A:
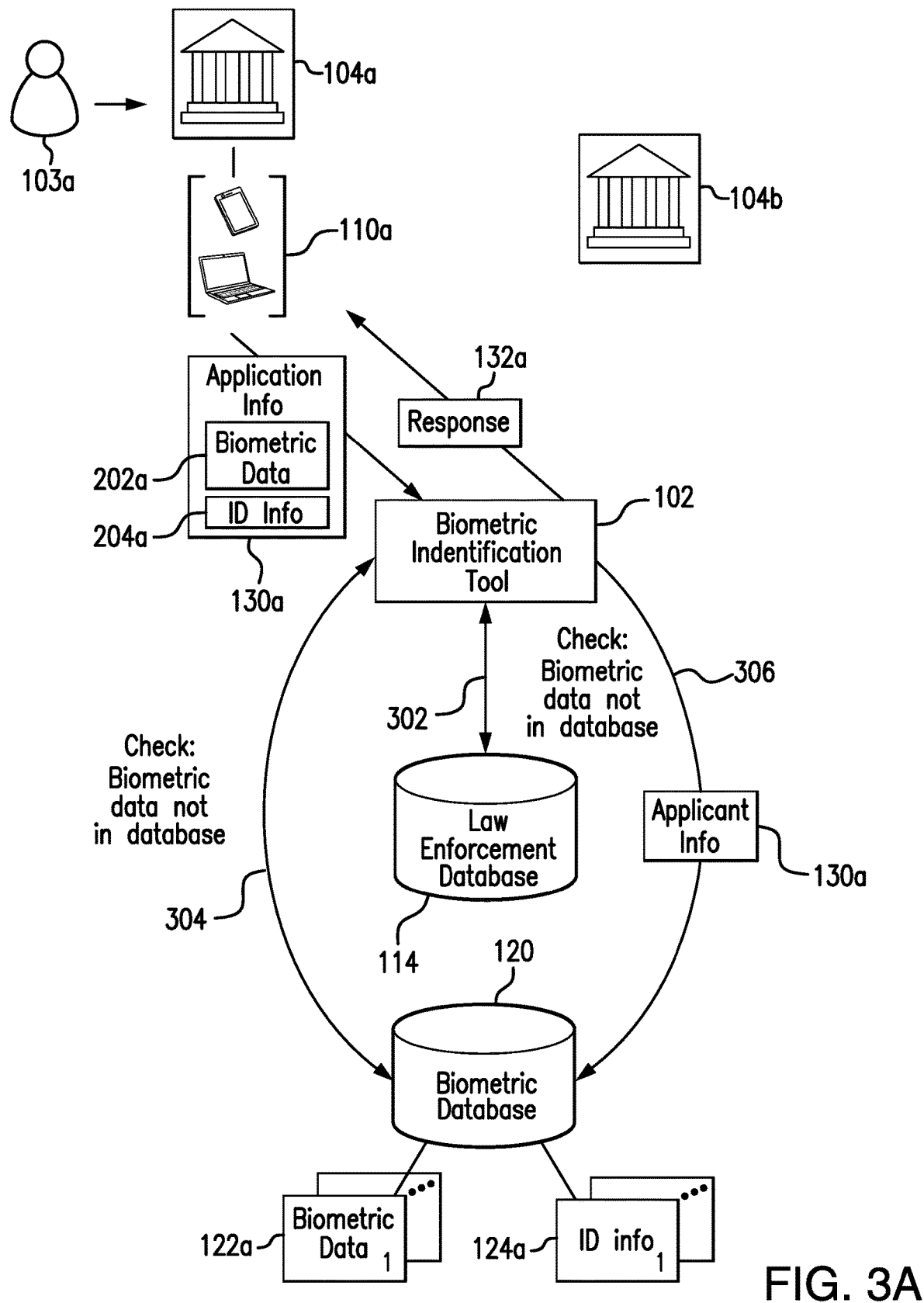
FIG. 3A illustrates an example of the process by which the biometric identification tool of the identity verification system of FIG. 1 registers an account applicant in a biometric database.

FIG. 3A illustrates an example of the process by which biometric identification tool 102 registers an individual 103a in biometric database 120. As illustrated in FIG. 3A, in response to individual 103a providing his/her biometric data 202a and identification information 204a at institution 104a, device 110a transmits this information to biometric identification tool 102, as applicant information 130a. In certain embodiments, in response to receiving applicant information 130a, biometric identification tool 102 first performs check 302, to determine whether individual 103a's biometric data 202a exists within an external database 114. For example, biometric identification tool 102 may determine whether individual 103a's biometric data 202a exists within a law enforcement database 114.

If, as illustrated in FIG. 3A, biometric identification tool 102 determines, during check 302, that individual 103a's biometric data 202a does not exist within external database 114, biometric identification tool 102 next performs check 304, to determine whether individual 103a's biometric data 202a exists within biometric database 120. As an example, in certain embodiments where biometric data 122 is stored in biometric database as fuzzy hash values, performing check 304, to determine whether individual 103a's biometric data 202a exists within biometric database 120, may include (1) applying a fuzzy hashing algorithm to individual 103a's biometric data 202a, (2) comparing one or more of the resulting fuzzy hash values with the fuzzy hash values stored in biometric database 120 as biometric data 122, and (3) determining whether any of the fuzzy hash values stored in database 120 as biometric data 122 agree with the fuzzy hash value(s) of individual 103a's biometric data 202a, within a certain tolerance. As another example, in certain embodiments where biometric data 122 includes facial images, performing check 304, to determine whether individual 103a's biometric data 202a exists within biometric database 120, may include applying a facial recognition algorithm 129 to determine whether an image of individual 103a's face (consistent with an image provided in biometric data 202a) exists within biometric database 120.

If, during check 304, biometric identification tool 102 determines that individual 103a's biometric data 202a does not exist within biometric database 120, biometric identification tool 102 performs process 306 of storing individual 103a's biometric data 202a and identification 204a in database 120. For example, biometric identification tool 102 may store individual 103a's biometric data 202a in biometric database 120 as biometric data 122a and individual 103a's identification information 204a in biometric database 120 as identification information 124a. In response to registering individual 103a with biometric database 120, biometric identification tool 102 may transmit a message 132a to device 110a of institution 104a, notifying institution 104a that individual 103a has not previously attempted to open an account at any of institutions 104a through 104n.

While FIG. 3A illustrates an example in which individual 103a's biometric data (as provided in applicant information 130a) does not exist within external database 114, in certain embodiments, individual 103a's biometric data may exist within external database 114. In such embodiments, in response to determining that individual 103a's biometric data exists within external database 114, biometric identification tool 102 may transmit a message 132 to institution 104a, notifying institution 104a of the presence of individual 103a's biometric data within external database 114. For example, where external database 114 is a law enforcement database, biometric identification tool 102 may transmit a message to institution 104a indicating that individual 103a has been involved in criminal activity. Institution 104a may use this information in any suitable manner. For example, in certain embodiments, an individual at institution 104a may use this information to decline to open an account for individual 103a.

IV. Verifying an Account Applicant's Identity Using a Biometric Database

Figure 3B:
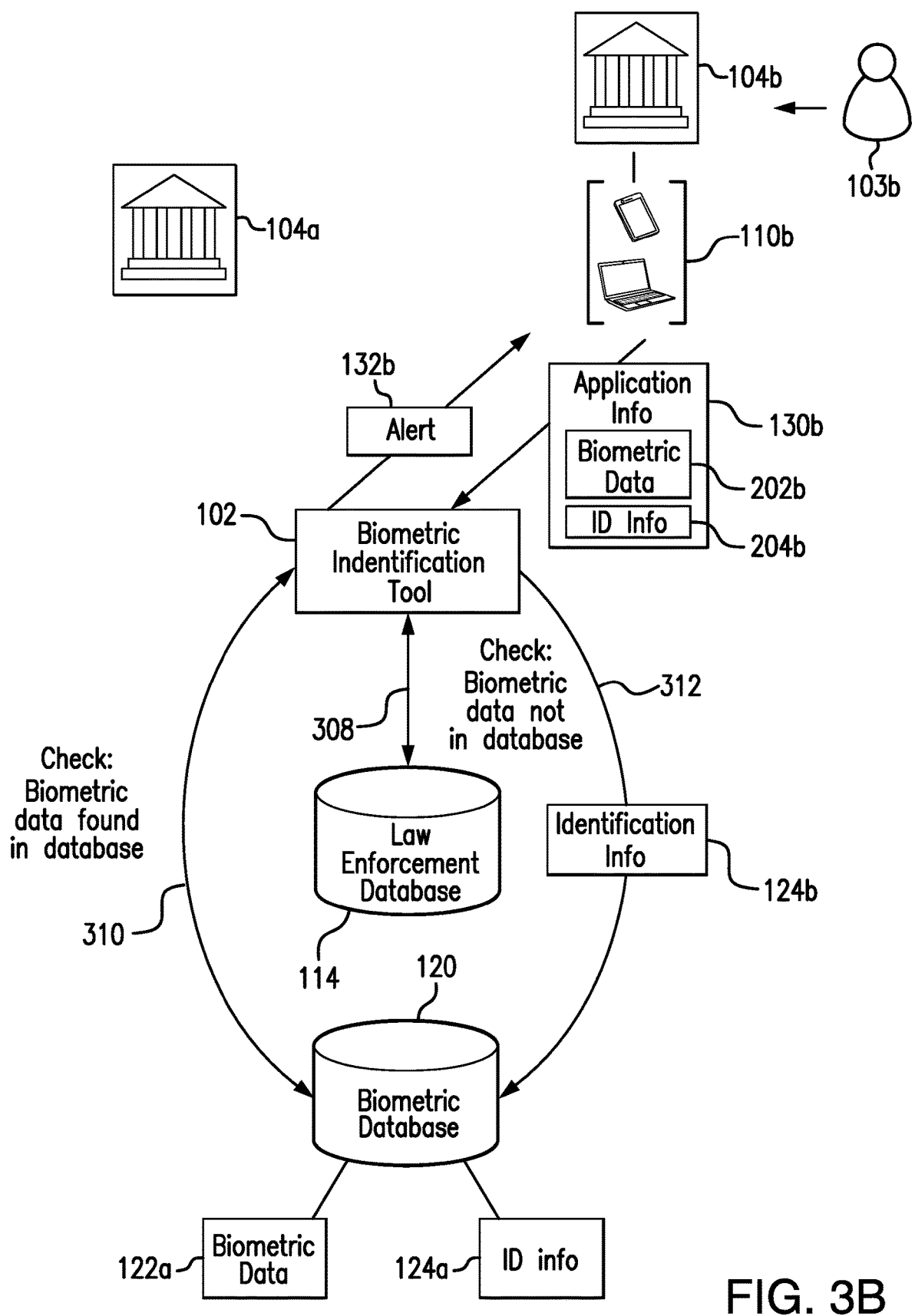
FIG. 3B illustrates an example of the process by which the biometric identification tool of the identity verification system of FIG. 1 uses a biometric database to verify the identity of an account applicant.

FIG. 3B illustrates an example of the process by which biometric identification tool 102 uses biometric database 120 to verify the identity of an individual 103b. As illustrated in FIG. 3B, in response to individual 103b providing his/her biometric data 202b and identification information 204b at institution 104b, device 110b transmits this information to biometric identification tool 102, as applicant information 130b. In certain embodiments, individual 103b is the same person as individual 103a. As an example, in certain such embodiments, individual 103a/b is attempting to open an account at institution 104b for a legitimate purpose. Accordingly, both biometric data 202b and identification information 204b may be consistent with biometric data 202a and identification information 204a provided by individual 103a/b to institution 104a. As another example, in certain such embodiments, individual 103a/b is attempting to open a fake account at institution 104b. Accordingly, while biometric data 202b may be consistent with biometric data 202a, identification information 204b may be inconsistent with identification information 204a.

In certain embodiments, in response to receiving applicant information 130b, biometric identification tool 102 first performs check 308, to determine whether individual 103b's biometric data 202b exists within external database 114. For example, biometric identification tool 102 may determine whether individual 103b's biometric data 202b exists within a law enforcement database 114. As illustrated in FIG. 3B, in response to determining that individual 103b's biometric data 202b does not exist within external database 114, biometric identification tool 102 next performs check 310, to determine whether individual 103b's biometric data 202b exists within biometric database 120. As an example, in certain embodiments where biometric data 122 is stored in biometric database as fuzzy hash values, performing check 310, to determine whether individual 103b's biometric data 202b exists within biometric database 120, may include (1) applying a fuzzy hashing algorithm to individual 103b's biometric data 202b, (2) comparing one or more of the resulting fuzzy hash values with the fuzzy hash values stored in biometric database 120 as biometric data 122, and (3) determining whether any of the fuzzy hash values stored in database 120 as biometric data 122 agree with the fuzzy hash value(s) of individual 103b's biometric data 202b, within a certain tolerance. As another example, in certain embodiments where biometric data 122 includes facial images, performing check 310, to determine whether individual 103b's biometric data 202b exists within biometric database 120, may include applying a facial recognition algorithm 129 to determine whether an image of individual 103b's face (consistent with an image provided in biometric data 202b) exists within biometric database 120.

If, during check 310, biometric identification tool 102 determines that individual 103b's biometric data 202b does exist within biometric database 120 (for example as biometric data 122a), biometric identification tool 102 next performs process 312, to determine whether individual 103b's identification information 204b is consistent with the identification information that is stored in biometric database 120 (for example, as identification information 124a). As an example, in certain embodiments in which individual 103b is the same person as individual 103a and individual 103a/b is attempting to open an account at institution 104b for a legitimate purpose, biometric identification tool 102 determines that biometric data 202b exists within biometric database 120 as biometric data 122a and that identification information 204b is consistent with identification information 124a (stored in biometric database 120 as corresponding to biometric data 122a). In response to such a determination, in certain embodiments, biometric identification tool 102 may transmit a message 132b to device 110b of institution 104b indicating that biometric identification tool 102 has verified individual 104b's identity. As another example, in certain embodiments in which individual 103b is the same person as individual 103a and individual 103a/b is attempting to open a fake account at institution 104b, biometric identification tool 102 determines that biometric data 202b exists within biometric database 120 as biometric data 122a and that identification information 204b is inconsistent with identification information 124a (stored in biometric database 120 as corresponding to biometric data 122a). In response to such a determination, biometric identification tool 102 may transmit an alert 132b to device 110b of institution 104b indicating that biometric identification tool 102 was unable to verify the identity of individual 103b. In response to receiving alert 132b, device 110b may initiate one or more security procedures, as described in Section I above and Section V below.

While FIG. 3B illustrates an example in which individual 103b's biometric data (as provided in applicant information 130b) does not exist within external database 114, in certain embodiments, individual 103b's biometric data may exist within external database 114. In such embodiments, in response to determining that individual 103b's biometric data exists within external database 114, biometric identification tool 102 may transmit a message 132b to institution 104b, notifying institution 104b of the presence of individual 103b's biometric data within external database 114. For example, where external database 114 is a law enforcement database, biometric identification tool 102 may transmit a message to institution 104b indicating that individual 103b has been involved in criminal activity. Institution 104b may use this information in any suitable manner. For example, in certain embodiments, an individual at institution 104b may use this information to decline to open an account for individual 103b.

Figure 4:
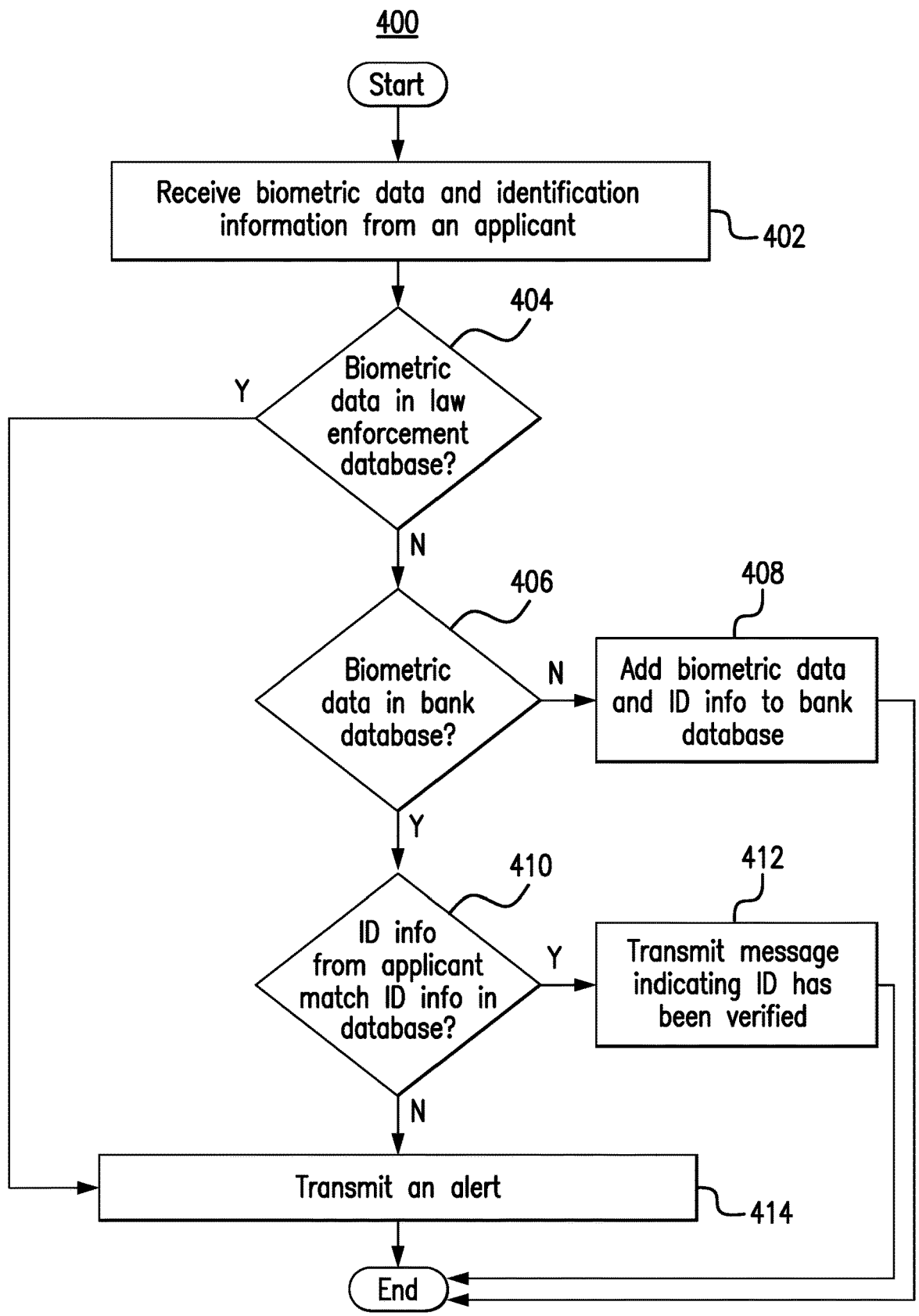
FIG. 4 presents a flowchart illustrating the process by which the biometric identification tool of the identity verification system of FIG. 1 registers new account applicants in a biometric database and uses the biometric database to verify the identities of existing account holders who are applying for new accounts.

V. Method of Verifying the Identity of an Account Applicant Using a Biometric Database FIG. 4 present a flowchart illustrating an example method 400 by which biometric identification tool 102 registers new account applicants 103 in a biometric database 120 and uses the biometric database 120 to verify the identities of account holders 103 who are applying for new accounts. In step 402 biometric identification tool 102 receives biometric data 202 and identification information 204 corresponding to an individual 103 who is seeking to open an account at institution 104. In step 404 biometric identification tool 102 determines whether individual 103's biometric data 202 exists within an external database 114. For example, biometric identification tool 102 determines whether biometric data 202 exists with a law enforcement database 114. If, in step 404 biometric identification tool 102 determines that individual 103's biometric data 202 exists within external database 114, in step 414 biometric identification tool 102 transmits an alert 132 to device 110 of institution 104. Alert 132 may include information 118 that was stored in external database 114 along with individual 103's biometric data 202. For example, in certain embodiments in which external database 114 is a law enforcement database, alert 132 may include information 118 regarding one or more criminal activities in which individual 103 participated.

If, in step 404 biometric identification tool 102 determines that individual 103's biometric data 202 does not exist within external database 114, in step 406 biometric identification tool 102 determines whether individual 103's biometric data 202 exists within biometric database 120. If, in step 406 biometric identification tool 102 determines that individual 103's biometric data 202 does not exist within biometric database 120, in step 408 biometric identification tool 102 adds individual 103's biometric data 202 and identification information 204 to biometric database 120. For example, biometric identification tool 102 may store biometric data 202 in database 120 as biometric data 122a and identification information 204 in database 120 as identification information 124a. In certain embodiments, biometric identification tool 102 may additionally transmit a message to device 110 of institution 104 indicating that individual 103 has not previously attempted to open an account with any of the institutions 104a through 104n within the network of institutions 104 sharing biometric data with one another.

If, in step 406 biometric identification tool 102 determines that biometric data 202 does exist within biometric database 120 (for example, as biometric data 122b), in step 410 biometric identification tool 102 determines whether the identification information stored in biometric database 120 as corresponding to individual 103's biometric data (for example, as identification information 124b) is consistent with the identification information 204 provided by individual 103. If, in step 410 biometric identification tool 102 determines that identification information 124b, stored in biometric database 120, is consistent with identification information 204, provided by individual 103, in step 412 biometric identification tool 102 transmits a message 132 to device 110 of institution 104, indicating that the tool has verified individual 103's identity.

If, in step 410 biometric identification tool 102 determines that identification information 124b, stored in biometric database 120, is inconsistent with identification information 204, provided by individual 103, in step 414 biometric identification tool 102 transmits an alert 132 to device 110 of institution 104, indicating that the tool was unable to verify individual 103's identity. In certain embodiments, in response to receiving alert 132, device 110 may initiate one or more security procedures. As an example, in certain embodiments, device 110 may display a message to user 108 instructing user 108 to decline opening an account for individual 103. As another example, in certain embodiments, device 110 may instruct user 108 to obtain additional/supplemental information from individual 103. For example, message 132 may indicate that the address that individual 103 provided in identification information 204 does not match the address stored in biometric database 120. Accordingly, device 110 may instruct user 108 to obtain one or more previous addresses of individual 103 for comparison with the information stored in database 120. As another example, in certain embodiments, device 110 may automatically transmit a message to a law enforcement agency notifying the law enforcement agency of potentially fraudulent activity. As a further example, in certain embodiments where the biometric data provided by individual 130 exists in biometric database as biometric data 122a, device 110 may automatically lock an account associated with biometric data 122a (e.g., an account that was previously opened when biometric data was first stored in biometric database 120).

Modifications, additions, or omissions may be made to method 400 depicted in FIG. 4. Method 400 may include more, fewer, or other steps. For example, steps may be performed in parallel or in any suitable order. While discussed as biometric identification tool 102 (or components thereof) performing the steps, any suitable component of system 100, such as biometric device(s) 106 and/or device(s) 110, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. A system comprising:
a plurality of biometric sensors, wherein each biometric sensor from among the plurality of biometric sensors is configured to capture sensor data that indicates one or more physical characteristics associated with applicants, wherein the plurality of biometric sensors comprises at least one of a fingerprint scanner or an eye scanner;
a biometric database configured to store a first data corresponding to a first account holder, the first data comprising:
a first encrypted biometric data obtained from the first account holder at a first location associated with a first institution, wherein the first encrypted biometric data is generated using a particular hashing algorithm, wherein the particular hashing algorithm comprises a fuzzy hashing algorithm that when executed by a processor, causes the processor to generate a fuzzy hash value that remains consistent despite a certain degree of variation in biometric data associated with a same applicant, wherein the first encrypted biometric data represented a first set of features extracted from the sensor data by a machine learning algorithm, wherein the first set of features comprises at least one of a fingerprint feature or an iris feature; and
a first encrypted identification information provided by the first account holder at the first location, wherein the first encrypted identification information is dif- ferent from the first encrypted biometric data, and was used to open an existing account at the first location; and a distributed network of institutions comprising the first institution and a second institution, wherein:
  the distributed network of institutions is formed to verify identities of applicants for opening new accounts at any member of the distributed network of institutions based at least in part upon data obtained from at least another member of the distributed network of institutions;
  each member of the distributed network of institutions comprises a device configured to facilitate communications of a respective institution;
  the distributed network of institutions is formed in response to establishing a network communication path between a first device associated with the first institution, a second device associated with the second institution, and the biometric database;
  each member of the distributed network of institutions is communicatively coupled with other members of the distributed network of institutions;
  the biometric database is created by the distributed network of institutions and operably coupled to the distributed network of institutions; and
  each member of the distributed network of institutions shares biometric data and identification information obtained from applicants and account holders with the other members of the distributed network of institutions by storing the obtained biometric data and identification information in the biometric database, such that the first data is received by the first device; and the first data is encrypted using the particular hashing algorithm and stored in the biometric database;

a hardware processor communicatively coupled to the biometric database, the hardware processor being associated with the first device, and configured to:
  derive the first encrypted biometric data from the first set of features;
  generate, via the fuzzy hashing algorithm, a first fuzzy hash value based at least in part upon the first encrypted biometric data;
  receive, from the second device over a network, a second data corresponding to a first applicant, the second data comprising:
    a second biometric data obtained from the first applicant at a second location associated with the second institution that is different from the first institution; and
    a second identification information provided by the first applicant at the second location, wherein the first applicant is requesting to open a new account using the second identification information that is different from the second biometric data at the second location; and
  in response to receiving the second data corresponding to the first applicant:
    determine that the first applicant is the first account holder based at least in part upon:
      fetching the first encrypted biometric data from the biometric database using the established communication path;
      encrypting the second biometric data by feeding the second biometric data to the particular hashing algorithm;
      generating, via the fuzzy hashing algorithm, a second fuzzy hash value based at least in part upon the second encrypted biometric data;
      comparing the first encrypted biometric data to the second encrypted biometric data; and
      determining that the second encrypted biometric data obtained from the first applicant is within a certain degree of variation from the first encrypted biometric data obtained from the first account holder and stored in the biometric database;
      comparing the first fuzzy hash value and the second fuzzy hash value; and
      determining that the first fuzzy hash value corresponds to the second fuzzy hash value despite the determined certain degree of variation between the first encrypted biometric data and the second encrypted biometric data;
    determine that the first applicant is attempting to open the new account using a fake identity based at least in part determining that the second encrypted identification information provided by the first applicant does not match the first encrypted identification information provided by the first account holder and stored in the biometric database; and
    in response to determining that the second encrypted biometric data obtained from the first applicant is within the certain degree of variation from the first encrypted biometric data obtained from the first account holder, determining that the first fuzzy hash value corresponds to the second fuzzy hash value despite the determined certain degree of variation between the first encrypted biometric data and the second encrypted biometric data, and that the second encrypted identification information provided by the first applicant does not match the first encrypted identification information provided by the first account holder:
      transmit an alert to the second device over the network, the alert indicating that an identity of the first applicant could not be verified; and
      decline opening the new account for the first applicant at the second location.

2. The system of claim 1, wherein:
the first encrypted biometric data obtained from the first account holder comprises at least one of:
  a fingerprint of the first account holder;
  a palmprint of the first account holder;
  a recording of a voice of the first account holder;
  DNA of the first account holder; and
  a scan of an iris of the first account holder; and
the second encrypted biometric data obtained from the first applicant comprises at least one of:
  a fingerprint of the first applicant;
  a palmprint of the first applicant;
  a recording of a voice of the first applicant;
  DNA of the first applicant; and
  a scan of an iris of the first applicant.

3. The system of claim 1, wherein:
the first encrypted identification information provided by the first account holder comprises at least one of:
  a name of the first account holder;
  an address of the first account holder;
  a date of birth of the first account holder;
  a driver license number of the first account holder; and
  a social security number of the first account holder; and the second encrypted identification information provided by the first applicant comprises at least one of:
a name of the first applicant;
an address of the first applicant;
a date of birth of the first applicant;
a driver license number of the first applicant; and
a social security number of the first applicant.

4. The system of claim 1, wherein:
the biometric database is further configured to store a third data corresponding to a second account holder, the third data comprising:
a third encrypted biometric data obtained from the second account holder at the first location; and
a third encrypted identification information provided by the second account holder at the first location, wherein the third encrypted identification information is different from the third encrypted biometric data, and was used to open a second existing account at the first location; and
the hardware processor is further configured to:
receive, from the device over the network, a fourth data corresponding to a second applicant, the fourth data comprising:
a fourth encrypted biometric data obtained from the second applicant at the second location; and
a fourth encrypted identification information provided by the second applicant at the second location, wherein the second applicant is requesting to open a second new account using the fourth encrypted identification information that is different from the fourth encrypted biometric data at the second location; and
in response to receiving the fourth data corresponding to the second applicant:
determine that the fourth encrypted biometric data obtained from the second applicant matches the third encrypted biometric data obtained from the second account holder and stored in the biometric database;
determine that the fourth encrypted identification information provided by the second applicant matches the third encrypted identification information provided by the second account holder and stored in the biometric database; and
in response to determining that the fourth encrypted biometric data obtained from the second applicant matches the third encrypted biometric data obtained from the second account holder and that the fourth encrypted identification information provided by the second applicant matches the third encrypted identification information provided by the second account holder: transmit a message to the device over the network indicating that an identity of the second applicant has been verified.

5. The system of claim 1, wherein the hardware processor is further configured to:
access an external database comprising biometric data obtained from individuals who pose a security risk; and
determine that the second encrypted biometric data obtained from the first applicant does not match any biometric data stored in the external database.

6. The system of claim 5, wherein the hardware processor is further configured to:
receive, from the device over the network, a second applicant data corresponding to a second applicant, the second applicant data comprising:
a second applicant encrypted biometric data obtained from the second applicant at the second location; and
a second applicant encrypted identification information provided by the second applicant at the second location, wherein the second applicant is requesting to open a second new account using the second applicant encrypted identification information at the second location; and
in response to receiving the second applicant data corresponding to the second applicant:
access the external database;
determine that the second applicant encrypted biometric data obtained from the second applicant matches biometric data stored in the external database; and
in response to determining that the second applicant encrypted biometric data obtained from the second applicant matches the biometric data stored in the external database, transmit a message to the device over the network indicating that the second applicant poses a security risk.

7. The system of claim 1, wherein the device comprises a biometric scanner configured to obtain the second encrypted biometric data of the first applicant by scanning at least one physical attribute of the first applicant.

8. A method comprising:
capturing, by plurality of biometric sensors, sensor data that indicates one or more physical characteristics associated with applicants, wherein the plurality of biometric sensor comprises at least one of a fingerprint scanner or an eye scanner;
receiving, by a first device, over a network, a first data corresponding to a first applicant, the first data comprising:
a first encrypted biometric data obtained from the first applicant at a first location associated with a first institution, wherein the first encrypted biometric data is generated using a particular hashing algorithm, wherein the particular hashing algorithm comprises a fuzzy hashing algorithm that when executed by a processor, causes the processor to generate a fuzzy hash value that remains consistent despite a certain degree of variation in biometric data associated with a same applicant, wherein the first encrypted biometric data represented a first set of features extracted from the sensor data by a machine learning algorithm, wherein the first set of features comprises at least one of a fingerprint feature or an iris feature; and
a first encrypted identification information provided by the first applicant to a first device at the first location, wherein the first applicant is requesting to open a new account using the first encrypted identification information that is different from the first encrypted biometric data at the first location, wherein the first institution is a member of a distributed network of institutions; and
in response to receiving the first data corresponding to the first applicant:
verifying an identify of the first applicant based at least in part upon data obtained from another member of the distributed network of institutions, wherein:
the distributed network of institutions is formed to verify identities of applicants for opening new accounts at any member of the distributed network of institutions based at least in part upon data obtained from at least another member of the distributed network of institutions;

each member of the distributed network of institutions comprises a device configured to facilitate communications of a respective institution;
the distributed network of institutions is formed in response to establishing a network communication path between the first device associated with the first institution, a second device associated with the second institution, and a biometric database;
each member of the distributed network of institutions is communicatively coupled with other members of the distributed network of institutions;
the biometric database is created by the distributed network of institutions and operably coupled to the distributed network of institutions; and
each member of the distributed network of institutions shares biometric data and identification information obtained from applicants and account holders with the other members of the distributed network of institutions by storing the obtained biometric data and identification information in the biometric database, such that the first data is received by the first device; and the first data is encrypted using the particular hashing algorithm and stored in the biometric database;
deriving the first encrypted biometric data from the first set of features;
generating, via the fuzzy hashing algorithm, a first fuzzy hash value based at least in part upon the first encrypted biometric data;
determining that the first applicant is the first account holder based at least in part upon:
fetching the first encrypted biometric data from the biometric database using the established communication path;
encrypting a second biometric data by feeding the second biometric data to the particular hashing algorithm;
generating, via the fuzzy hashing algorithm, a second fuzzy hash value based at least in part upon the second encrypted biometric data;
comparing the first encrypted biometric data to the second encrypted biometric data;
determining that the first encrypted biometric data obtained from the first applicant is within a certain degree of variation from a second encrypted biometric data obtained from a first account holder at a second location associated with a second institution that is different from the first institution;
comparing the first fuzzy hash value and the second fuzzy hash value;
determining that the first fuzzy hash value corresponds to the second fuzzy hash value despite the determined certain degree of variation between the first encrypted biometric data and the second encrypted biometric data;
determining that the first encrypted identification information provided by the first applicant does not match a second encrypted identification information provided by the first account holder at the second location, wherein the second encrypted identification information provided by the first account holder is different from the second encrypted biometric data, and was used to open an existing account at the second location; and
in response to determining that the first encrypted biometric data obtained from the first applicant is within the certain degree of variation from the second encrypted biometric data obtained from the first account holder, determining that the first fuzzy hash value corresponds to the second fuzzy hash value despite the determined certain degree of variation between the first encrypted biometric data and the second encrypted biometric data, and that the first encrypted identification information provided by the first applicant does not match the second encrypted identification information provided by the first account holder:
transmit an alert to the first device over the network, the alert indicating that an identity of the first applicant could not be verified; and
decline opening the new account for the first applicant at the first location.

9. The method of claim 8, wherein:
the second encrypted biometric data obtained from the first account holder comprises at least one of:
a fingerprint of the first account holder;
a palmprint of the first account holder;
a recording of a voice of the first account holder;
DNA of the first account holder; and
a scan of an iris of the first account holder; and
the first encrypted biometric data obtained from the first applicant comprises at least one of:
a fingerprint of the first applicant;
a palmprint of the first applicant;
a recording of a voice of the first applicant;
DNA of the first applicant; and
a scan of an iris of the first applicant.

10. The method of claim 8, wherein:
the second encrypted identification information provided by the first account holder comprises at least one of:
a name of the first account holder;
an address of the first account holder;
a date of birth of the first account holder;
a driver license number of the first account holder; and
a social security number of the first account holder; and
the first encrypted identification information provided by the first applicant comprises at least one of:
a name of the first applicant;
an address of the first applicant;
a date of birth of the first applicant;
a driver license number of the first applicant; and
a social security number of the first applicant.

11. The method of claim 8, wherein:
receiving, from the device over the network, a third data corresponding to a second applicant, the third data comprising:
a third encrypted biometric data obtained from the second applicant at the first location; and
a third encrypted identification information provided by the second applicant at the first location, wherein the second applicant is requesting to open a second new account using the third encrypted identification information that is different from the third encrypted biometric data at the first location; and
in response to receiving the third data:
determining that the third encrypted biometric data obtained from the second applicant matches a fourth encrypted biometric data obtained from a second account holder at the second location;
determine that the third encrypted identification information provided by the second applicant matches a fourth encrypted identification information provided by the second account holder at the second location, wherein the fourth encrypted identification information provided by the second account holder is different from the fourth encrypted biometric data, and was used to open a second existing account at the second location; and in response to determining that the third encrypted biometric data obtained from the second applicant matches the fourth encrypted biometric data obtained from the second account holder and that the third encrypted identification information provided by the second applicant matches the fourth encrypted identification information provided by the second account holder, transmit a message to the device over the network indicating that an identity of the second applicant has been verified.

12. The method of claim 8, further comprising:

accessing an external database comprising biometric data obtained from individuals who pose a security risk; and determining that the first encrypted biometric data obtained from the first applicant does not match any biometric data stored in the external database.

13. The method of claim 12, further comprising:

receiving, from the device over the network, a second applicant data corresponding to a second applicant, the second applicant data comprising:
 a second applicant encrypted biometric data obtained from the second applicant at the first location; and
 a second applicant encrypted identification information provided by the second applicant at the first location, wherein the second applicant is requesting to open a second new account using the second applicant encrypted identification information at the first location; and in response to receiving the second applicant data:
 accessing the external database;
 determining that the second applicant encrypted biometric data obtained from the second applicant matches biometric data stored in the external database; and
 in response to determining that the second applicant encrypted biometric data obtained from the second applicant matches the biometric data stored in the external database, transmit a message to the device over the network indicating that the second applicant poses a security risk.

14. The method of claim 8, wherein the device comprises a biometric scanner configured to obtain the first encrypted biometric data of the first applicant by scanning at least one physical attribute of the first applicant.

15. A non-transitory computer-readable medium that stores instructions, wherein when the instructions are executed by one or more processors, cause the one or more processors to:

capture, via plurality of biometric sensors, sensor data that indicates one or more physical characteristics associated with applicants, wherein the plurality of biometric sensors comprises at least one of a fingerprint scanner or an eye scanner;

store, in a biometric database, a first data corresponding to a first account holder, the first data comprising:
 a first encrypted biometric data obtained from the first account holder at a first location associated with a first institution, wherein the first encrypted biometric data is generated using a particular hashing algorithm, wherein the particular hashing algorithm comprises a fuzzy hashing algorithm that when executed by a processor, causes the processor to generate a fuzzy hash value that remains consistent despite a certain degree of variation in biometric data associated with a same applicant, wherein the first encrypted biometric data represented a first set of features extracted from the sensor data by a machine learning algorithm, wherein the first set of features comprises at least one of a fingerprint feature or an iris feature; and
 a first encrypted identification information provided by the first account holder to a first device at the first location, wherein the first encrypted identification information is different from the first encrypted biometric data, and was used to open an existing account at the first location, wherein the first institution is a member of a distributed network of institutions;

transmit a second data corresponding to a first applicant to a hardware processor associated with a second device and a second institution, the second data comprising:
 a second biometric data obtained from the first applicant at a second location associated with a second institution that is different from the first institution; and
 a second identification information provided by the first applicant at the second location, wherein the first applicant is requesting to open a new account using the second identification information that is different from the second biometric data at the second location; and wherein the hardware processor is configured to:
 derive the first encrypted biometric data from the first set of features;
 generate, via the fuzzy hashing algorithm, a first fuzzy hash value based at least in part upon the first encrypted biometric data;
 receive, from the second device over a network, the second data corresponding to the first applicant; and
 in response to receiving the second data corresponding to the first applicant:
  access the biometric database;
  verify an identify of the first applicant based at least in part upon data obtained from another member of the distributed network of institutions, wherein:
   the distributed network of institutions is formed to verify identities of applicants for opening new accounts at any member of the distributed network of institutions based at least in part upon data obtained from at least another member of the distributed network of institutions;
   each member of the distributed network of institutions comprises a device configured to facilitate communications of a respective institution;
   the distributed network of institutions is formed in response to establishing a network communication path between the first device associated with the first institution, the second device associated with the second institution, and the biometric database;
   each member of the distributed network of institutions is communicatively coupled with other members of the distributed network of institutions;
   the biometric database is created by the distributed network of institutions and operably coupled to the distributed network of institutions; and
   each member of the distributed network of institutions shares biometric data and identification information obtained from applicants and
account holders with the other members of the
distributed network of institutions by storing
the obtained biometric data and identification
information in the biometric database, such that
the first data is received by the first device; and
the first data is encrypted using the particular
hashing algorithm and stored in the biometric
database;
determine that the first applicant is the first account
holder based at least in part upon:
fetching the first encrypted biometric data from
the biometric database using the established
communication path;
encrypting the second biometric data by feeding
the second biometric data to the particular hashing algorithm;
generating, via the fuzzy hashing algorithm, a
second fuzzy hash value based at least in part
upon the second encrypted biometric data;
comparing the first encrypted biometric data to the
second encrypted biometric data; and
determining that the second encrypted biometric
data obtained from the first applicant is within
a certain degree of variation from the first
encrypted biometric data obtained from the first
account holder and stored in the biometric database;
comparing the first fuzzy hash value and the
second fuzzy hash value; and
determining that the first fuzzy hash value corresponds to the second fuzzy hash value despite
the determined certain degree of variation
between the first encrypted biometric data and
the second encrypted biometric data;
determine that the first applicant is attempting to
open the new account using a fake identity based
at least in part determining that the second
encrypted identification information provided by
the first applicant does not match the first
encrypted identification information provided by
the first account holder and stored in the biometric
database; and
in response to determining that the second encrypted
biometric data obtained from the first applicant is
within the certain degree of variation from the first
encrypted biometric data obtained from the first
account holder, determining that the first fuzzy
hash value corresponds to the second fuzzy hash
value despite the determined certain degree of
variation between the first encrypted biometric
data and the second encrypted biometric data, and
that the second encrypted identification information provided by the first applicant does not match
the first encrypted identification information provided by the first account holder:
transmit an alert to the second device over the
network, the alert indicating that an identity of
the first applicant could not be verified; and
decline opening the new account for the first
applicant at the second location.

16. The non-transitory computer-readable medium of
claim 15, wherein:
the first encrypted biometric data obtained from the first
account holder comprises at least one of:
a fingerprint of the first account holder;
a palmprint of the first account holder;
a recording of a voice of the first account holder;
DNA of the first account holder; and
a scan of an iris of the first account holder; and
the second encrypted biometric data obtained from the
first applicant comprises at least one of:
a fingerprint of the first applicant;
a palmprint of the first applicant;
a recording of a voice of the first applicant;
DNA of the first applicant; and
a scan of an iris of the first applicant.

17. The non-transitory computer-readable medium of
claim 15, wherein:
the first encrypted identification information provided by
the first account holder comprises at least one of:
a name of the first account holder;
an address of the first account holder;
a date of birth of the first account holder;
a driver license number of the first account holder; and
a social security number of the first account holder; and
the second encrypted identification information provided
by the first applicant comprises at least one of:
a name of the first applicant;
an address of the first applicant;
a date of birth of the first applicant;
a driver license number of the first applicant; and
a social security number of the first applicant.

18. The non-transitory computer-readable medium of
claim 15, wherein instructions when executed by the one or
more processors, further cause the one or more processors
to:
store, in the biometric database, a third data corresponding to a second account holder, the third data comprising:
a third encrypted biometric data obtained from the
second account holder at the first location; and
a third encrypted identification information provided
by the second account holder at the first location,
wherein the third encrypted identification information is different from the third encrypted biometric
data, and was used to open a second existing account
at the first location;
wherein the first device is further configured to:
transmit a fourth data corresponding to a second applicant to the hardware processor, the fourth data comprising:
a fourth encrypted biometric data obtained from the
second applicant at the second location; and
a fourth encrypted identification information provided by the second applicant at the second location, wherein the second applicant is requesting to
open a second new account using the identification
information that is different from the fourth
encrypted biometric data at the second location;
and
wherein the hardware processor is further configured to:
receive, from the device over the network, the fourth
data corresponding to the second applicant;
in response to receiving the fourth data corresponding
to the second applicant:
access the biometric database;
determine that the fourth encrypted biometric data
obtained from the second applicant matches the
third encrypted biometric data obtained from the
second account holder and stored in the database;
determine that the fourth encrypted identification
information provided by the second applicant
matches the third encrypted identification information provided by the second account holder and stored in the database; and in response to determining that the fourth encrypted biometric data obtained from the second applicant matches the third encrypted biometric data obtained from the second account holder and that the fourth encrypted identification information provided by the second applicant matches the third encrypted identification information provided by the second account holder, transmit a message to the device over the network indicating that an identity of the second applicant has been verified.

19. The non-transitory computer-readable medium of claim 15, wherein the instructions when executed by the one or more processors, further cause the one or more processors to:

access the biometric database; and determine that the second encrypted biometric data obtained from the first applicant does not match any biometric data stored in the biometric database.

20. The non-transitory computer-readable medium of claim 19, wherein instructions when executed by the one or more processors, further cause the one or more processors to:

transmit a second applicant data corresponding to a second applicant to the hardware processor, the second applicant data comprising:

a second applicant encrypted biometric data obtained from the second applicant at the second location; and a second applicant encrypted identification information provided by the second applicant at the second location, wherein the second applicant is requesting to open a second new account using the second applicant encrypted identification information at the second location; and the hardware processor is further configured to:

receive, from the first device over the network, the second applicant data corresponding to the second applicant; and in response to receiving the second applicant data corresponding to the second applicant:

access the biometric database;

determine that the second applicant encrypted biometric data obtained from the second applicant matches biometric data stored in an external database; and in response to determining that the second applicant encrypted biometric data obtained from the second applicant matches the biometric data stored in the external database, transmit a message to the device over the network indicating that the second applicant poses a security risk.

\* \* \* \* \*